March 3, 1959 — E. A. MORRIS — 2,875,449
MAMMARY PROSTHESES
Filed April 2, 1957

INVENTOR
EUNICE ALICE MORRIS
BY
ATTORNEY

United States Patent Office 2,875,449
Patented Mar. 3, 1959

2,875,449
MAMMARY PROSTHESES

Eunice Alice Morris, Blackpool, England

Application April 2, 1957, Serial No. 650,129

Claims priority, application Great Britain August 28, 1956

1 Claim. (Cl. 3—36)

This invention relates to mammary prostheses for use by patients after radical mastectomy.

Proposals have been made to provide devices to be strapped to the body, including inflatable devices, and sponge rubber. These devices have however not provided complete satisfaction as they tend to move out of desired position, may deflate when not required, and do not shape themselves to brassieres, and consequently give rise to great anxiety on the part of the already self-conscious patient.

According to the present invention a mammary prosthesis comprises a bag of flexible material partially filled with a granular mass. The granular mass adapts itself readily to the shape of a brassiere and to the shape of the patient. Preferably the granular mass has a suitable specific gravity. I find that millet bird's seed is suitable. However, I have searched for a more permanent and hygienic material and have found that a granular synthetic plastic having a specific gravity from 0.9 to 1.5 is suitable especially granular polystyrene which has a specific gravity of 1.04 to 1.06.

The invention will now be further described by way of example with reference to the accompanying drawings wherein.

Figure 1:
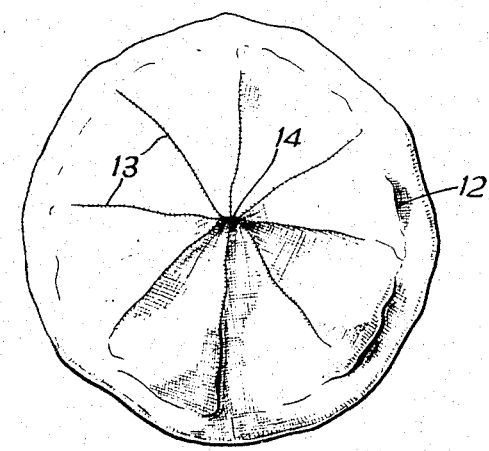
Figure 1 is a plan view of a prosthesis made in accordance with the invention as laid on a table.
Figure 2:
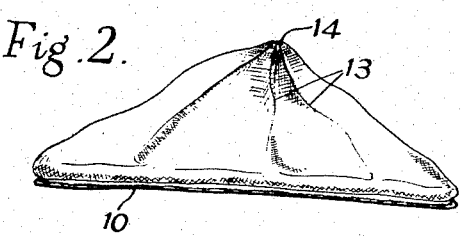
Figure 2 is a side elevational view thereof.
Figure 3:
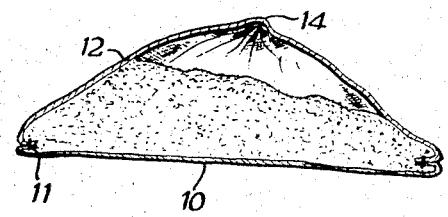
Figure 3 is a sectional view thereof.

The prosthesis consists of a circular piece 10 of short material such as surgical lint or velvet 4 to 6 inches in diameter according to the size of the patient, to the periphery of which is stitched at 11 a band 12 of strong cotton or nylon or like textile material. This band is of rectangular shape about three and a half inches deep but is stitched to form seams 13 which converge to a common position 14. This forms a bag which is then partially filled with 4 to 16 ounces of the granular mass such as millet or granular plastic through an opening in the seam 11 which opening is then closed by stitching.

The bag may be enclosed in an outer similar bag or cover which can be removed, washed and replaced. Or the bag without a cover can be washed and dried.

Figure 4:
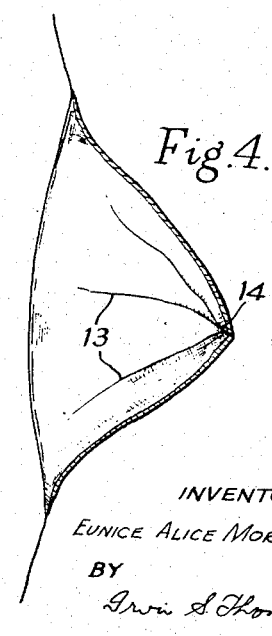
Figure 4 is a sectional view of a brassiere showing the normal position of the prosthesis.

The prosthesis is merely placed in any normal brassiere such as shown in Figure 4 and it at once takes up the shape of the brassiere but is deformable so as to adapt itself to movements of the arm and body but does not become undesirably displaced. It does not require any straps or other attachment means other than those of the usual brassiere.

I claim:

A mammary prosthesis comprising a bag consisting of a circular piece of soft material, a band of textile material attached at its periphery to said circular piece and formed with seams converging to a central common position, said bag being filled with a mass of granules of polystyrene having a specific gravity between 1.04 and 1.06 and each granule being of a size less than ⅛ of an inch in any direction.

References Cited in the file of this patent

UNITED STATES PATENTS 2,108,205    Martin _____ Feb. 15, 1938